US012579301B2

(12) United States Patent
Bruce et al.

(10) Patent No.: US 12,579,301 B2
(45) Date of Patent: Mar. 17, 2026

(54) DATA PLANE MANAGEMENT SYSTEMS AND METHODS

(71) Applicant: F5, Inc., Seattle, WA (US)

(72) Inventors: Maxwell Bruce, Reno, NV (US); Issac Roth, San Francisco, CA (US); Wesley Hales, Woodstock, CA (US)

(73) Assignee: F5, Inc., Seattle, WA (US)

( * ) Notice: Subject to any disclaimer, the term of this patent is extended or adjusted under 35 U.S.C. 154(b) by 225 days.

(21) Appl. No.: 18/199,321

(22) Filed: May 18, 2023

(65) Prior Publication Data

US 2024/0386130 A1 Nov. 21, 2024

(51) Int. Cl.
*G06F 21/00* (2013.01)
*G06F 21/62* (2013.01)
*H04L 9/40* (2022.01)

(52) U.S. Cl.
CPC ...... *G06F 21/6245* (2013.01); *H04L 63/1425* (2013.01)

(58) Field of Classification Search
CPC .......................... G06F 21/6245; H04L 63/1425
See application file for complete search history.

(56) References Cited

U.S. PATENT DOCUMENTS

2021/0334384 A1* 10/2021 Ranjan ................. G06F 11/3636
2021/0383014 A1* 12/2021 Yang ...................... G06N 20/00

2022/0156369 A1* 5/2022 Narayanaswamy .. H04L 9/0872
713/168
2024/0134725 A1* 4/2024 Bosch ..................... H04L 65/00
2024/0364720 A1* 10/2024 Golway .............. H04L 63/1425

OTHER PUBLICATIONS

Huyen, Chip, "Buidling a Generative AI Platform," hyuenchip.com; Jul. 25, 2024, 30 pages.
Spires et al., "Built with Fastly Spotlight: LeakSignal stops GenAI data leaks", available online: <URL:https://www.fastly.com/blog/built-with-fastly-spotlight-leaksignal-stops-genai-data-leaks/>, accessed Aug. 2, 2024, published Jun. 18, 2024, 8 pages.
EP Extended Search Report issued in EP Application No. 25193190. 3, mailed on Aug. 8, 2025, 9 pp.
Grant, Dasher et al: "Architectures for Protecting Cloud Data Planes", arxiv. org, Cornell University Library, 201 Olin Library Cornell University Ithica, NY 14853, Jan. 31, 2022, XP091141327, 43 pp.

* cited by examiner

*Primary Examiner* — Michael M Lee
(74) *Attorney, Agent, or Firm* — Troutman Pepper Locke LLP

(57) ABSTRACT

Systems and methods for data plane management are disclosed herein. An example method includes deploying a WASM that is embedded in a service routing layer of the service mesh, assigning a security policy to the WASM from a bootstrapping layer of the service mesh, the security policy enabling the WASM to detect patterns in the service mesh data that are indicative of sensitive information, evaluating service mesh data by the WASM with the security policy, and transmitting telemetry to a cloud-based command module when the WASM has detected patterns in the service mesh data.

19 Claims, 7 Drawing Sheets

128

Traffic Item

Response ID 330a3f5b-a45c-4fed-81bf-d6e14d5c698b

Match Details

FIG. 4B

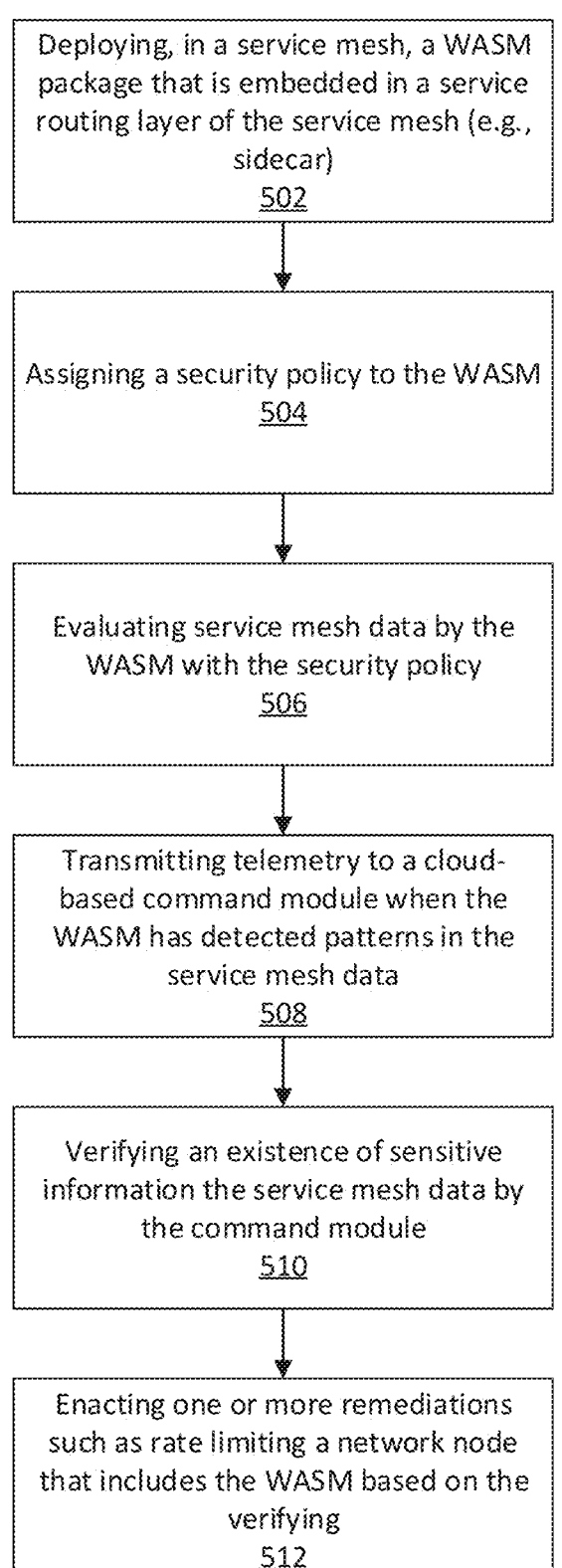

Deploying, in a service mesh, a WASM package that is embedded in a service routing layer of the service mesh (e.g., sidecar)
502

Assigning a security policy to the WASM
504

Evaluating service mesh data by the WASM with the security policy
506

Transmitting telemetry to a cloud-based command module when the WASM has detected patterns in the service mesh data
508

Verifying an existence of sensitive information the service mesh data by the command module
510

Enacting one or more remediations such as rate limiting a network node that includes the WASM based on the verifying
512

*FIG. 5*

DATA PLANE MANAGEMENT SYSTEMS AND METHODS

CROSS-REFERENCE TO RELATED APPLICATIONS

N/A

TECHNICAL FIELD

This disclosure pertains to cybersecurity and more specifically, but not by way of limitation, to systems and methods that can be deployed within the data plane or service mesh to protect sensitive data communicated through microservices and other service mesh runtime logic.

SUMMARY

According to some embodiments, the present disclosure is directed to a method comprising deploying, in a service mesh, a WebAssembly a.k.a. WASM (binary package) that is embedded in a service routing layer of the service mesh, assigning a security policy to the WASM, the security policy enabling the security WASM to detect patterns in service mesh data that are indicative of sensitive information, evaluating service mesh data by the WASM with the security policy, and transmitting telemetry to a cloud-based command module when the WASM has detected patterns in the service mesh data.

According to some embodiments, the present disclosure is directed to a system comprising a WASM deployed in each WASM compatible node of a service mesh, the WASM being installed on a sidecar of the WASM compatible node and being configured to apply a security policy that is used to search raw data for patterns that are indicative of sensitive data; a command module that: assigns the security policy to the WASM; receives telemetry data from the WASM, the telemetry data comprising an indication that the raw data possesses patterns that are indicative of sensitive data; and verify that the raw data includes the sensitive data; and a data lake scanner that is configured to evaluate stored data of the service mesh for sensitive information.

BRIEF DESCRIPTION OF DRAWINGS

Exemplary embodiments are illustrated by way of example and not limitation in the figures of the accompanying drawings, in which like references indicate similar elements.

FIGS. 3, 4A and 4B are example dashboards that can be generated by a command module of the present disclosure.

FIG. 5 is a flowchart of an example method of the present disclosure.

DETAILED DESCRIPTION OF EXAMPLE EMBODIMENTS

Overview

Figure 1:
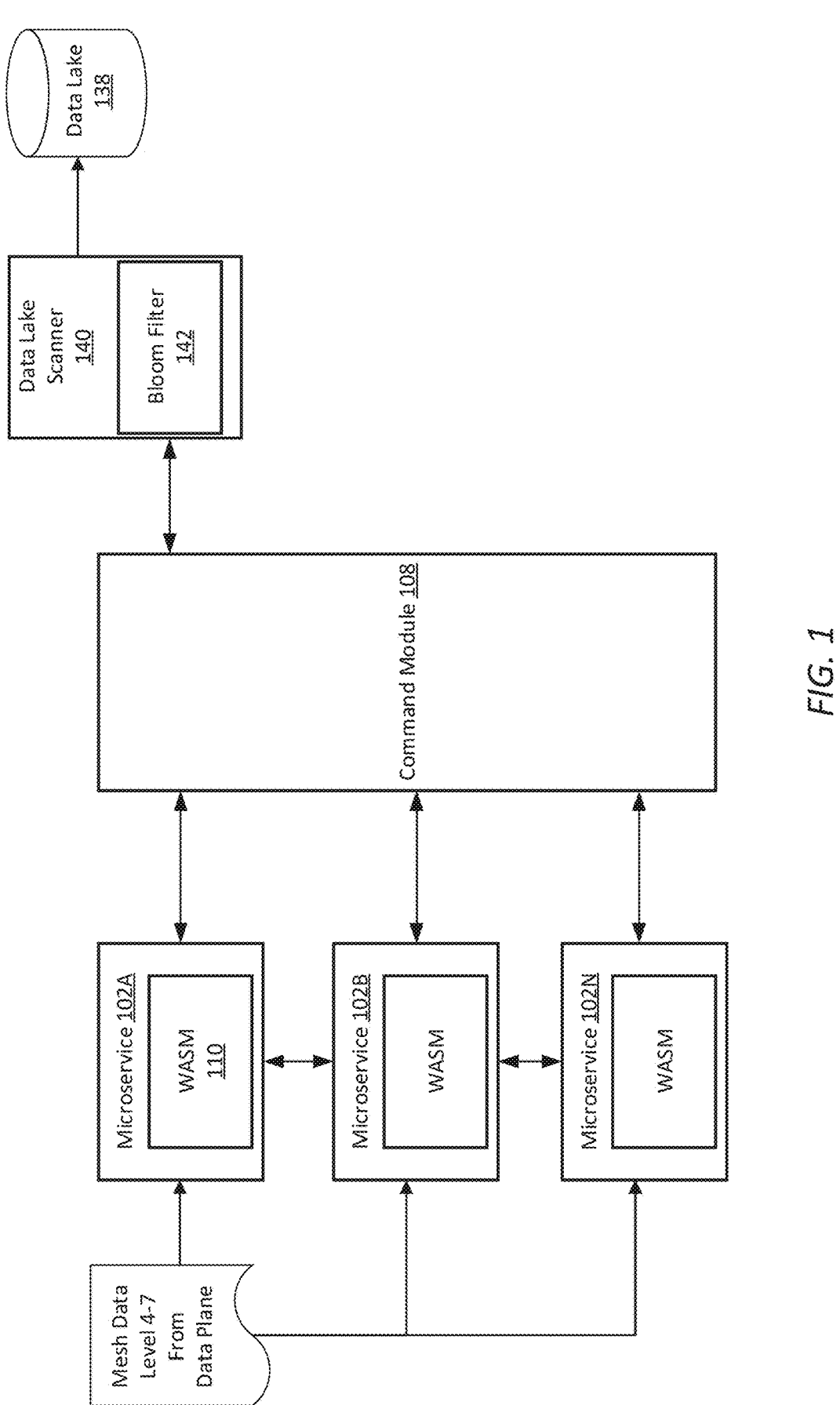
FIG. 1 is an example environment where aspects of the present disclosure can be implemented for use.

The present disclosure can be implemented, in some embodiments, as a security tool that offers observability metrics for sensitive data found in request/response content that is communicated across a data plane/service mesh. These systems and methods are useful for operations engineers, as it helps prevent API (application programming interface) exploits, misconfigurations, and sensitive data leakage.

Some embodiments include WASM binary packages that are deployed to sidecars or other data plane components, and a cloud-based command module (not limited to cloud implementations). A random worker thread can receive a security policy from the command module and forward the each of the WASM binary packages in the network. The security web assemblies can implement the security policy, process raw network data with the security policy, and return telemetry data to the cloud-based command module. Alerts can be generated and/or actions can be taken in response to policy violations or infractions. These actions can generally include redaction, rate limiting, and similar actions.

Example features of the present technology include fast, inline Layer 4-7 request/response analysis, and easily configurable rules (L7 policies) for detecting and analyzing sensitive data leakage, such as Personally Identifiable Information (PII) (any sensitive data are contemplated). The systems and methods can identify various data types like part numbers, account numbers, patient information, grades, dates, email addresses, and large arrays-just to name a few. Users can either write their own rules or use the continually updated ruleset library.

In some embodiments, a system of the present disclosure provides a cloud dashboard (again not limited to cloud embodiments) equipped with a policy editor, monitoring, and alerting functionalities. Analysis metrics can be exposed and integrated with monitoring. Installation of a toolset of the present disclosure is quick and simple, as it operates as a WASM filter for any proxy/API gateway that supports Proxy-WASM, such as Envoy.

Monitoring data flows between microservices and external systems is essential for maintaining a secure and efficient service infrastructure. By mapping service interactions, it is possible to gain a clear understanding of data flow patterns and connections. Decorating these interactions with posture indicators and sensitive data tracing allows organizations to pinpoint the origins and destinations of sensitive information, ensuring a comprehensive overview of data movements within the system.

Achieving instant visibility into risk severity across the service mesh is crucial for maintaining a secure environment. By identifying sensitive data emissions, organizations can better assess the likelihood of a breach and the potential business impact of data exfiltration or downtime. To uphold strict compliance and security requirements, it is necessary to enforce relevant frameworks and protocols across the organization, ensuring a consistent and secure approach to data management.

To further enhance security measures, organizations can deploy inline solutions in the data plane to explicitly match sensitive data. By implementing policies that include blocking and redaction, organizations can effectively manage and control sensitive information. Segmentation and service protection can be achieved through Service-Based Access Control (SBAC), offering both implicit (learned) and explicit service permissions. This approach prevents lateral movement, probing, and abuse, ultimately strengthening the overall security of the service infrastructure.

In sum, the systems and methods of the present disclosure leverage a lightweight WASM module that can be quickly installed into existing ingress, sidecar, and ambient mesh proxies, providing immediate visibility to assess data plane security posture and watches for signs of attack and of data leaking out and stops it from leaving. The agentless Inline Response Manager (IRM) is designed to process all outbound content, enabling unique data protection and audit capabilities that precisely identify accessed sensitive data. By automatically mapping all services and sensitive data in real time, the solution offers insights into data access across geographies, cloud environments, and clusters, leading to enhanced data security and management.

Example Embodiments

Referring now to FIG. 1, which illustrates an example architecture where aspects of the present disclosure are implemented. The architecture includes a data plane 100 (not depicted) that includes microservices 102A-102C (fewer or more microservices can be deployed). Each one of these services can include a sidecar proxy 104 (not depicted), as an example. These microservices communicate with one another and create mesh traffic 106 that includes raw data (also referred to as service mesh data).

In more detail, the microservices talk to each other through a new network level called the service mesh. This is a Layer 4-7 network infrastructure that takes care of routing, failover, load balancing, circuit breaking, encryption, and access control among microservices. In a microservice architecture, it doesn't make sense to whitelist IP or MAC addresses—the environment is too dynamic, and with containers, those resources are shared and thus too coarse to use for access control. Virtual networks, tokens, and interfaces are used. An example system evaluates the communications (service mesh data) to understand tokens, policy, authorization, and data contents—even parsing out JSON and the like.

These microservices could be, for instance, a router or proxy on the data plane. It will be understood that that the sidecar (Envoy) onto which the WASM package is deployed is not a microservice in most definitions, but an addon to an existing, user-defined microservice. The sidecar is provided by the service mesh. The microservices are also coupled with a cloud-based command module 108 that can transmit and configure policies that are disseminated to the sidecars. The command module 108 can also receive telemetry data back from the sidecars that can be used to generate alerts or enact remedial responses.

In general, the microservices may include proxies and API Gateways supporting Proxy-WASM. The deployment of the present technology uses the native functionality of a data plane or service mesh environment.

Metrics and configuration stay local in an environment, such as the network upon which the microservices are deployed. In some instances, metrics and configuration can be transmitted to the command module 108 and sensitive data are sent to the command module 108 by default. Specific endpoints, match rules, or an entire policy can opt-in to send raw, sensitive data, low-bit subsets of SHA-256 hashes for low-entropy data (i.e., credit cards, phone numbers), or no representation of the matched data at all.

Figure 2:
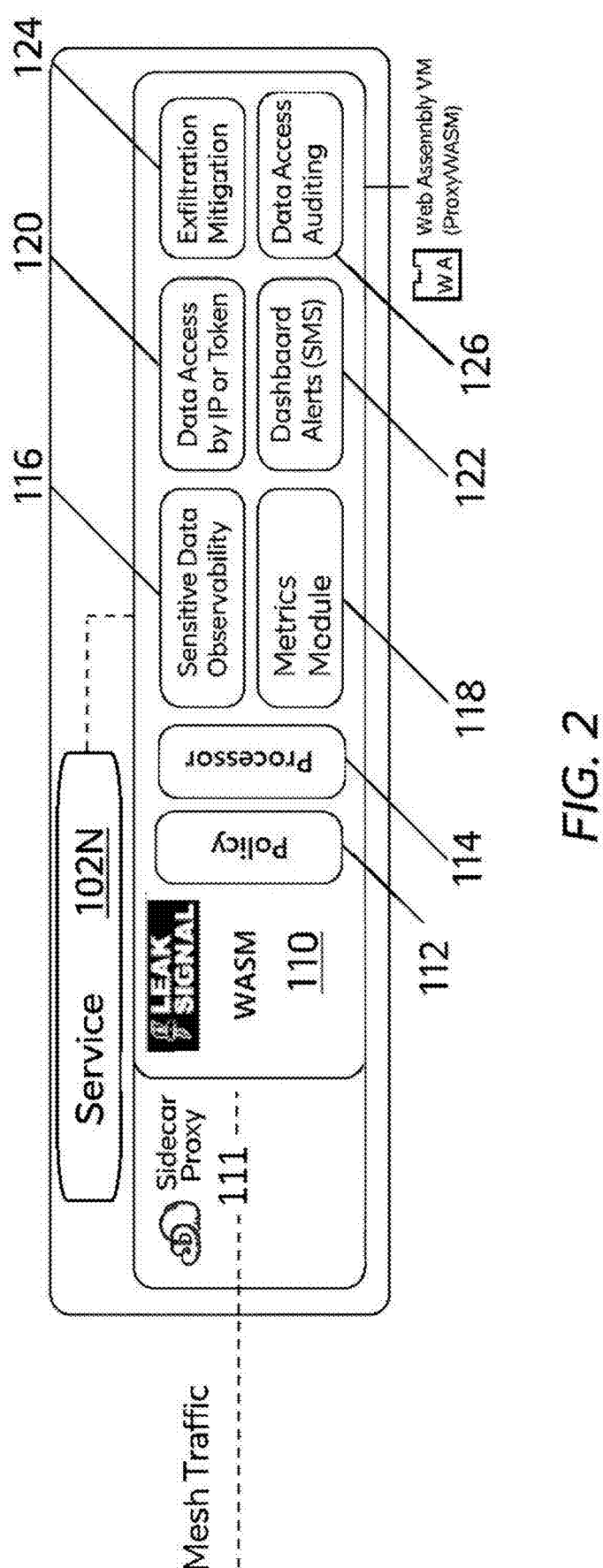
FIG. 2 is a schematic view of an example microservice and worker thread.

As shown in FIG. 2, a WASM 110 is installed on the microservice 102N. In some instances, the WASM 110 is installed on a sidecar 111 of the microservice 102N. Generally, the WASM 110 can be embedded in WASM compatible node in the service mesh. In general, the WASM is a binary package that is installed and is of a size that is approximately two to four megabytes in size. The WASM 110 is instantiated with a virtual machine in some embodiments. The WASM 110 includes a policy 112, a processor

114 (virtual), a sensitive data observability module 116, a metrics module 118, a data access module 120, a dashboard module 122, an exfiltration module 124, and a data access auditing module 126. Each of the modules can have at least one parameter that is defined by the security policy that is implemented by the policy 112.

In more detail, Envoy is deployed as a sidecar for the service mesh. A service mesh (i.e. Istio) will spin up such a sidecar for each microservice at a 1:1 ratio generally (or many:1 ratio for ambient mesh). Envoy (or any equivalent proxy) runs as a single process in a Docker container underneath the same Pod as a microservice. Effectively, this means Envoy is a separate but closely connected to a given microservice in the service mesh environment.

Envoy will launch a number of indistinguishable worker threads (e.g., microservices) when started. Envoy can be configured to load a Proxy-WASM module into each worker thread. One worker thread chosen at random (referred to as the leader) receives security policy from command over the network. It forwards that policy to all other worker threads in that individual Envoy process.

In some instances, the WASM binary package is approximately 2.5 MB in size. The "processor", "sensitive data observability", "metrics", "data access", "dashboard", "exfiltration", and "data access auditing" modules listed are example functions those modules would perform and are performed by the WASM binary package.

Figure 3:
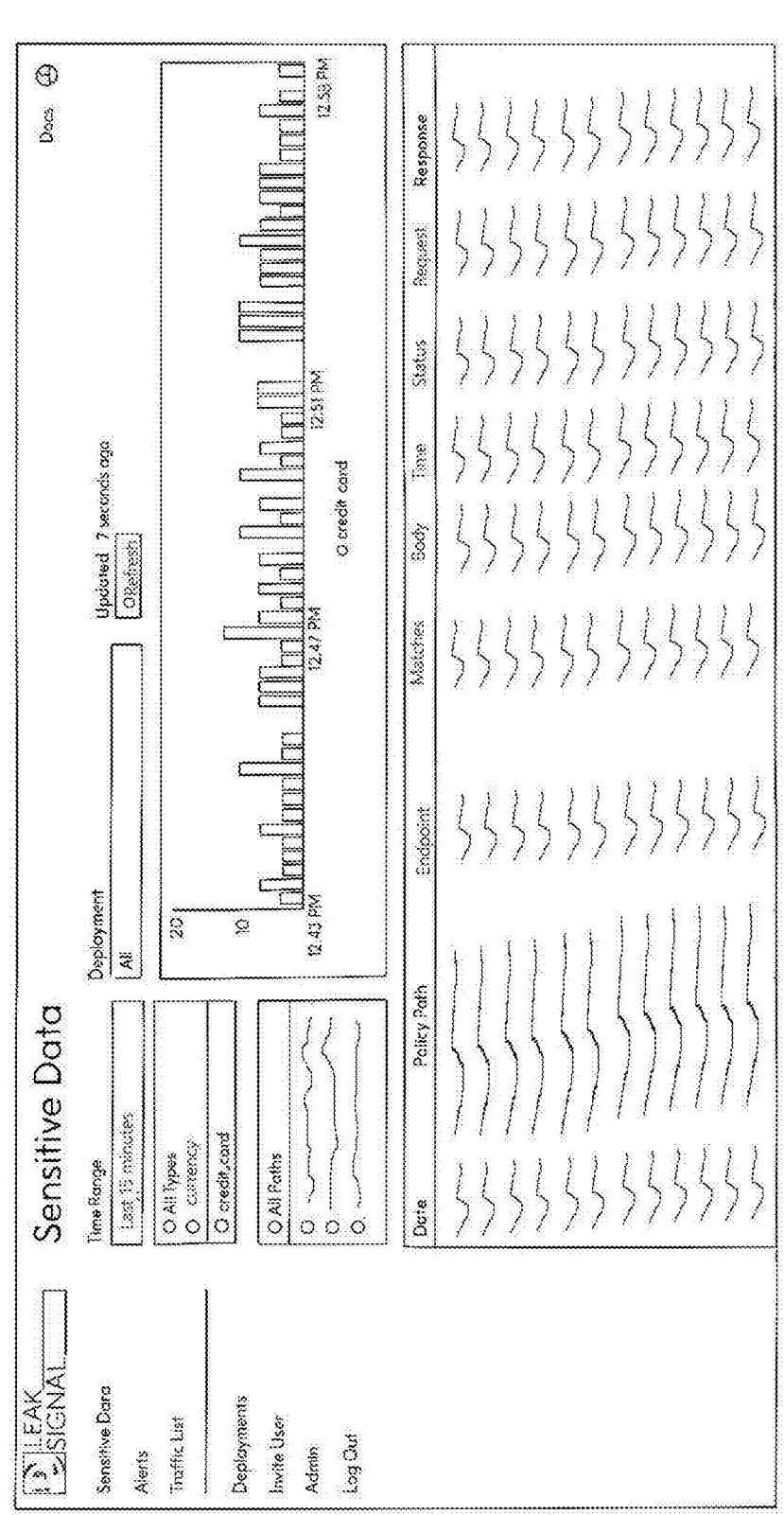

The command module (the cloud dashboard) provides visibility of data types and sends you SMS or email alerts (any alerting mechanism can be used) when abnormal or unauthorized data access occurs. FIG. 3 illustrates an example dashboard that is generated by the command module 108. The dashboard 128 displays data, and specifically telemetry data, from the microservices 102A and 102N (or from any microservice). In this example, microservice 102N is processing sensitive data, and found to be doing so from the implementation of a policy at the microservice level, and the resultant telemetry data from the microservice 102N is presented in the dashboard 128. In general, the cloud-based command module generates a dashboard that includes information pertaining to the service mesh data that comprises the sensitive information. In some instances, the command module 108 can map service interactions between two or more WASM compatible nodes of the service mesh and annotate the service interactions with tracing that is indicative of sensitive data in the communications. In more detail, each service's telemetry contains the origin, destination, and direction of data transmission. Multiple microservices' telemetry data can be pieced together in order to create a unified view of data moving between an arbitrary number of services.

Figure 4A:
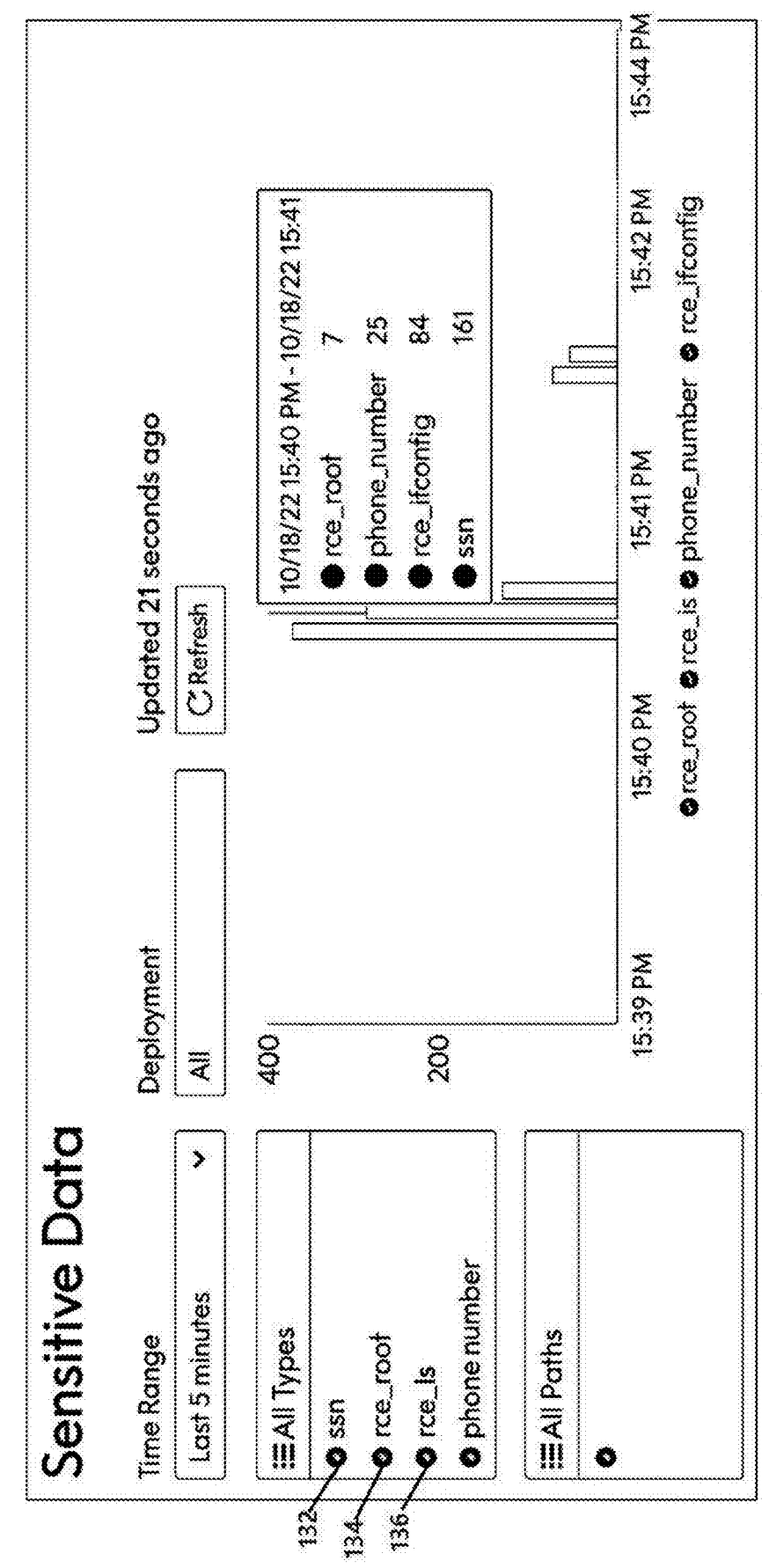

FIG. 4A is another example dashboard 130 that includes a data overview of the data plane. This chart shows the emission of sensitive data and exploited logic as defined by the policy.

Figure 4B:
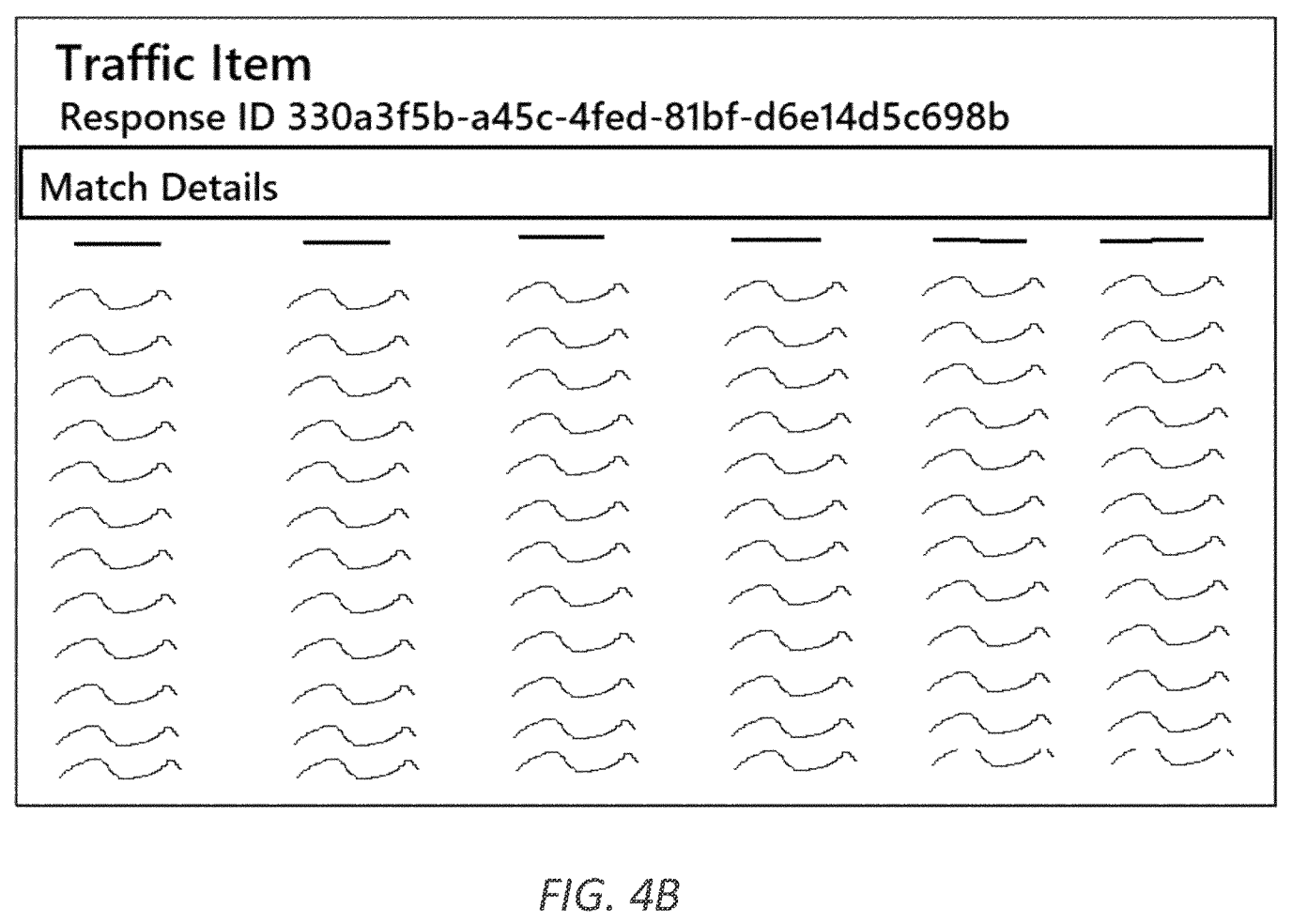

The element ssn001.html 132 contains PII data such as Social Security and Phone Numbers. The element 134 root.html is an example of a leaked configuration file or any response with the word "root" in it. The element 136 ls.html and ifconfig.html are examples of a response that contain results from a system command being executed on the server (RCE). When a user clicks on a Response ID, they can examine the alerts that were generated, which are shown in FIG. 4B.

Referring back to FIG. 1, the policy 112 is implemented at the microservices level and can be defined at the command module level and issued to the WASM 110 by a sidecar proxy 111 of the data plane 100. The policy can use logic such as matching or correlating. Matchers are data patterns that are searched in a response body. They can be regexes, raw values, exceptions (the ignore section), or accelerated native matchers. All individual matching strategies are considered individually, and a match by any matching strategy constitutes a match of the category. The policy can use, for example, regex logic to look for suspicious strings (can be case-sensitive), unformatted phone numbers, email addresses, and the like. A correlate category composes two other categories (generally matcher category), and signals a match if the two match within a certain distance of one another. Examples include unformatted phone numbers near the word phone.

Policies can be configuration files that drive how the system scans for sensitive data. Various endpoints can define how sensitive data is determined. One structure is a path glob, which are similar to a host-prefixed HTTP path and they are used to meaningfully differentiate request URLs in policies. An individual endpoint block is composed of one or more of path globs for matching paths, followed by a configuration set for the different matching rules, and two optional configuration sets for token extraction and data reporting style.

The policy can also implement rules which allow specific endpoints, services, and clusters to rate-limit (timed block) or alert on individual IP addresses (SPIFFE ID), tokens, service names, and the like. Rules in the top-level rules field of a policy, serve to manage and organize data traffic. These rules consist of several key fields, such as grouping, by, action, timespan_secs, limit, and filter, which help define the specific parameters for inbound data evaluation. The grouping field determines how data is categorized, whereas the by field establishes the unique identifier for the rule. The action field specifies what occurs when the rule conditions are met, and the timespan_secs field defines the time period for counting requests and responses. The limit field sets the maximum number of requests allowed within the timespan, and the filter field dictates the evaluation criteria.

Filters are another component of these rules, as they determine the conditions for rule execution. These filters can include keys related to endpoints, peer services, local services, tokens, IP addresses, request and response matches, and inbound or outbound responses. Each key can either require a match or exclude a match, depending on the desired outcome. Filters can be further customized with any or all sub-keys, allowing for more precise rule evaluation based on a combination of conditions, tokens, or service names.

The policy also includes service blocks. A service policy block can include several fields that help manage and control communication between services. The services field contains one or more Match Rules that identify the service name. In addition, there are optional fields such as blacklist and whitelist, which consist of one or more Match Rules for determining allowed and disallowed service communications. The blacklist is ignored if the whitelist is not empty.

Another optional field is block_unknown_services, which has a default value depending on whether the whitelist is empty or not. If the whitelist is non-empty, the default value is true; otherwise, it is false. When set to true, this field ensures that inbound communications from unknown services, such as those without mutual TLS (mTLS), are blocked. By combining these fields, service policy blocks can effectively regulate communication and enhance the security among services.

Match Rules serve as text-based filters that rely on one or more strings to manage rate-limits and service matching. These rules can be formatted with various optional prefixes to define the type of matching required. Some of these prefixes include regex:, raw:, raw_insensitive:, except:, except_regex:, and internal:.

The regex: prefix parses the rule as a regular expression and anchors it to the beginning and end of the input. By default, the raw: prefix requires an exact match, whereas raw_insensitive: demands an exact match regardless of case sensitivity. The except: prefix works similarly to raw: but negates previous rules with an exact match. The except_regex: prefix combines the functionalities of regex: and except: the internal: prefix uses a natively implemented matching function. Through these different formats, match rules offer a flexible and precise way to control and filter data traffic. In general, the policy can be used to search raw data for any type of personally identifiable information, or generally, any type of sensitive data. In some instances, the WASM 110 can evaluate requests and their responses for sensitive data.

Also, it will be understood that the WASM 110 is configured to evaluate the raw data to determine if it has patterns or signatures that are indicative of there being sensitive data present. The actual presence of the sensitive information in the raw data is confirmed by the command module 108, as will be discussed below.

Regardless of the policy specifics, the WASM 110 can inspect the raw data plane data it receives and apply the policy to the data in an effort to preliminarily review the raw data to determine if sensitive information is included. If the WASM 110 determines that the raw data includes sensitive information (in some instances, it is the detection of data patterns that appear to be sensitive data), the WASM 110 can generate telemetry data that is returned to the command module 108. The command module 108 receives telemetry data from the WASMs and the telemetry data comprises an indication that the raw data possess patterns that are indicative of sensitive data.

The command module 108 can then evaluate the telemetry data to verify that the data identified by the WASM 110 is, in fact, sensitive data. If the command module 108 verifies the presence of sensitive data from the telemetry data, the command module 108 can generate a report or dashboard for a user to review. Other actions include the transmission of an alert email or message. In some instances, the command module 108 can perform one or more remediations with respect to the data. In one example, the command module 108 can cause a WASM to redact the sensitive data and replace the same with a string of characters that do not include sensitive data. For example, if the command module 108 confirms that the data includes a social security number, that social security number can be removed and replaced with a 1-800 phone number. In other instances, the sensitive data may be deleted or masked.

Another example remediation includes a situation where the command module 108 determines that a large amount of data is being accessed by one or more microservices that include sensitive data. Rather than redacting/replacing, the command module 108 could rate limit the amount of data that can be accessed by the one or more microservices. For example, the command module 108 could send instructions to the WASM 110 to throttle the microservice's access to the data or alter how much data the microservice is allowed to transmit outside the data plane 100 to a destination that is not inside the data plane 100.

The data plane 100 may also include a data lake or database 138 of the customer where organizational data may reside. A third level of data analysis to determine the presence of sensitive data may occur when a data lake scanner 140. In some instances, the data lake scanner 140 may scan the data in the data lake every night (or other predetermined time) to examine the data stored therein for sensitive information. In some instances, the data lake scanner 140 can implement a bloom filter 142 and the logic of this bloom filter can be updated by the command module 108 on an as needed basis. In this way, with multiple levels of data analysis, it can be ensured that the customer's data has been thoroughly verified for the presence of sensitive information. Once sensitive information is detected, any number of the alerting or remediating measures described herein can be used.

FIG. 5 is a flowchart of an example method. The example method includes a step 502 of deploying, in a service mesh, a WASM binary package that is embedded in a service routing layer of the service mesh. This can include creating worker threads on each WASM capable node in the network by a bootstrapping layer of the network. The WASM binary package can be installed on a sidecar of a microservice, as noted above.

Next, the method includes a step 504 of assigning a security policy to the WASM, and this could be assigned from a random WASM of the service mesh that first receives the policy from the command module. In some instances, the security policy enables the WASM to detect patterns in service mesh data that are indicative of sensitive information. This can include using the regex processes described above or any other method that would be known to one of ordinary skill in the art.

In some embodiments, the method can include a step 506 of evaluating service mesh data by the WASM with the security policy, as well as a step 508 of transmitting telemetry to a cloud-based command module when the WASM has detected patterns in the service mesh data. In step 510, the method includes verifying an existence of sensitive information the service mesh data by the cloud-based command module.

In step 512, the cloud-based command module can enact one or more remediations such as rate limiting a network component that includes the WASM based on the verifying. Another remediation includes generating, by the cloud-based command module, a dashboard that includes information pertaining to the service mesh data that comprises the sensitive information. Yet another remediation includes redacting the sensitive information from the service mesh data, as well as replacing the sensitive information with a string of characters that does not include sensitive information. With respect to rate-limiting, the command module can rate limit by identifiers such as authentication tokens or another identifier, such as a SPIFFE ID.

Figure 6:
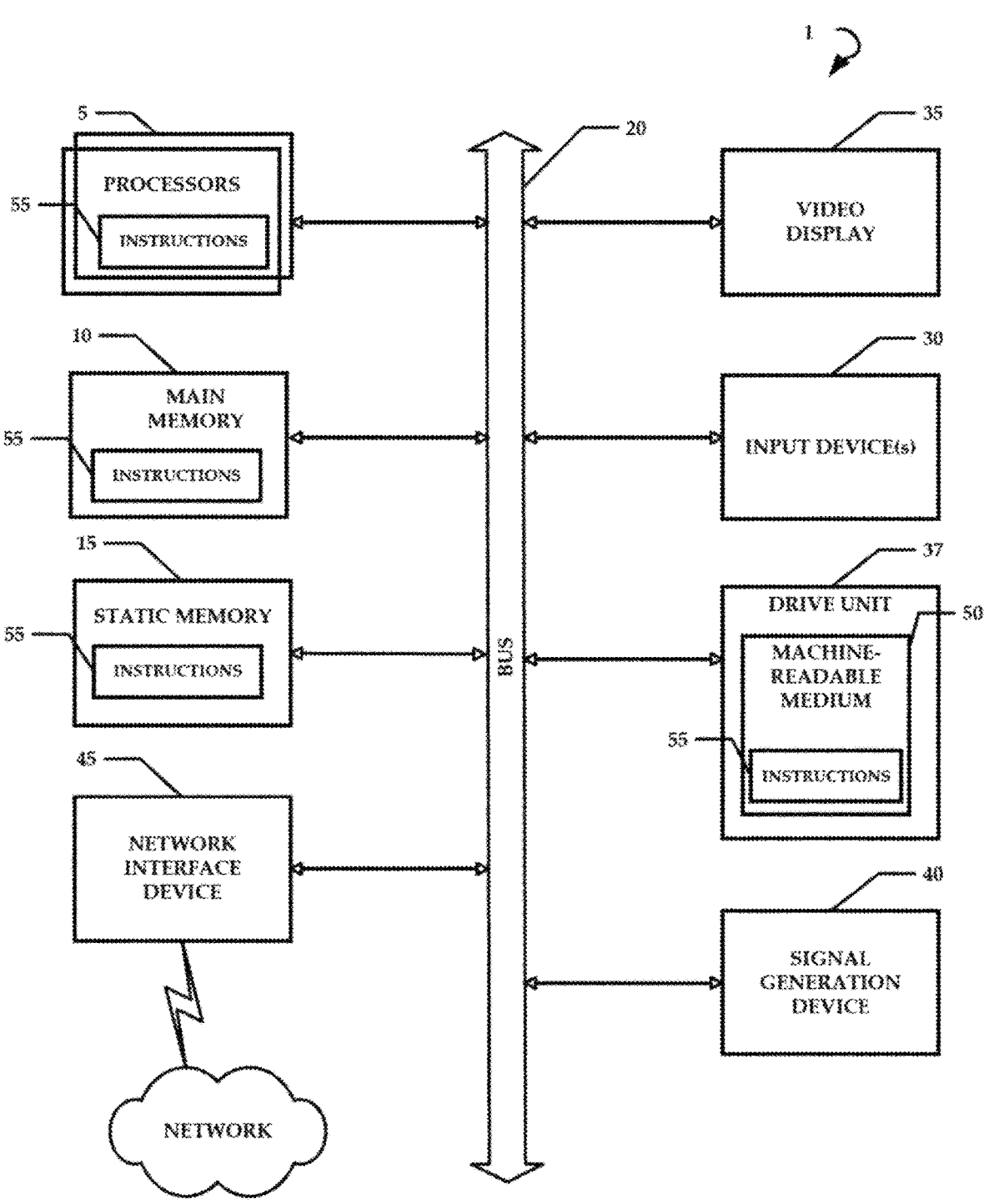
FIG. 6 is a simplified block diagram of a computing system, in accordance with some embodiments.

FIG. 6 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or decentralized) network environment. The machine may be a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or decentralized database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on." "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising." "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In this description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments.

Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The invention claimed is:

1. A method for data plane management, the method comprising:

deploying, in a service mesh, a WebAssembly (WASM) that is embedded in a service routing layer of the service mesh;

assigning a security policy to the WASM from a bootstrapping layer of the service mesh, the security policy enabling the WASM to detect patterns in service mesh data that are indicative of sensitive information;

receiving, from the WASM, telemetry comprising an indication that the service mesh data possesses the patterns indicative of the sensitive information;

evaluating the service mesh data by the WASM with the security policy; and transmitting the telemetry to a cloud-based command module when the WASM has detected the patterns in the service mesh data.

2. The method according to claim 1, further comprising monitoring the service mesh data between a first microservice and a second microservice.

3. The method according to claim 2, further comprising:

mapping service interactions between the first microservice and the second microservice; and annotating the service interactions with tracing that is indicative of sensitive data.

4. The method according to claim 1, wherein deploying comprises distributing the WASM to a virtual machine or container of each microservice or sidecar in the service mesh.

5. The method according to claim 4, wherein the WASM is approximately two to four megabytes in size.

6. The method according to claim 1, further comprising:

verifying an existence of the sensitive information in the service mesh data by the cloud-based command module.

7. The method according to claim 6, further comprising rate limiting a set of traffic moving through a sidecar, based on the verifying.

8. The method according to claim 6, further comprising generating, by the cloud-based command module, a dashboard that includes information pertaining to the service mesh data that comprises the sensitive information.

9. The method according to claim 6, further comprising redacting the sensitive information from the service mesh data.

10. The method according to claim 9, further comprising:

replacing the sensitive information with a string of characters that does not include the sensitive information.

11. A system, comprising:

a WebAssembly (WASM) deployed in each WASM compatible node of a service mesh, the WASM being installed on a sidecar of the each WASM compatible node and being configured to apply a security policy that is used to search raw data for patterns that are indicative of sensitive data;

a memory comprising instructions stored thereon;

a processor configured of executing the stored instructions to:

assign, using a command module, the security policy to the WASM;

receive, using the command module, telemetry data from the WASM, the telemetry data comprising an indication that the raw data possesses patterns that are indicative of sensitive data; and verify, using the command module, that the raw data includes the sensitive data; and a data lake scanner that is configured to evaluate stored data of the service mesh for sensitive information.

12. The system according to claim 11, wherein the security policy is disseminated by a random WASM of the service mesh.

13. The system according to claim 11, wherein the command module is configured to:

map service interactions between two or more WASM compatible nodes of the service mesh;

annotate the service interactions with tracing that is indicative of the sensitive data; and provide the annotated service interactions on a dashboard.

14. The system according to claim 11, wherein a random WASM is configured to:

distribute the security policy when the security policy is received from the command module.

15. The system according to claim 11, wherein the WASM is approximately two to four megabytes in size.

16. The system according to claim 11, wherein the command module is configured to:

case a WASM to rate limit the each WASM compatible node based on the verifying.

17. The system according to claim 11, wherein the command module is configured to generate a dashboard that includes information pertaining to the service mesh data that comprises the sensitive information.

18. The system according to claim 11, wherein the command module is configured to redact the sensitive information from the service mesh data.

19. The system according to claim 18, wherein the command module is configured to:

replace the sensitive information with a string of characters that does not include the sensitive information.

* * * * *